(12) United States Patent
Spitza

(10) Patent No.: US 7,002,094 B2
(45) Date of Patent: Feb. 21, 2006

(54) ELECTRICAL DISCHARGE MACHINING ELECTRODE HOLDER

(75) Inventor: Scott Spitza, West Bend, WI (US)

(73) Assignee: MGS Mfg. Group, Inc., Germantown, WI (US)

( * ) Notice: Subject to any disclaimer, the term of this patent is extended or adjusted under 35 U.S.C. 154(b) by 0 days.

(21) Appl. No.: 10/834,149

(22) Filed: Apr. 28, 2004

(65) Prior Publication Data
US 2004/0217090 A1 Nov. 4, 2004

Related U.S. Application Data

(60) Provisional application No. 60/467,048, filed on May 1, 2003.

(51) Int. Cl.
*B23H 1/04* (2006.01)
*B23H 7/26* (2006.01)

(52) U.S. Cl. .................................................. 219/69.15
(58) Field of Classification Search ............ 219/69.15, 219/69.11; 204/297.01
See application file for complete search history.

(56) References Cited

U.S. PATENT DOCUMENTS

| | | | | |
|---|---|---|---|---|
| 3,939,322 A | * | 2/1976 | Bonga | 219/69.11 |
| 4,754,115 A | * | 6/1988 | Rhoades | 219/69.15 |
| 4,847,464 A | * | 7/1989 | Moore, Sr. | 219/69.15 |
| 4,922,074 A | * | 5/1990 | Sebzda, Sr. | 219/69.15 |
| 6,268,580 B1 | * | 7/2001 | Boyer, Jr. | 219/69.15 |
| 6,444,941 B1 | * | 9/2002 | Russo | 219/69.15 |

FOREIGN PATENT DOCUMENTS

| | | | | |
|---|---|---|---|---|
| JP | 63-120037 A | * | 5/1988 |
| JP | 8-66831 A | * | 3/1996 |
| JP | 11-77440 A | * | 3/1999 |
| JP | 2000-15525 A | * | 1/2000 |

* cited by examiner

Primary Examiner—Geoffrey S. Evans
(74) Attorney, Agent, or Firm—Quarles & Brady LLP

(57) ABSTRACT

An electrode holder for EDM machines using automatic tool changing techniques provides a base plate that may be attached to an adapter of third party chuck systems and a simple compressed slot mechanism for holding the electrode without the need for epoxy or the like.

15 Claims, 2 Drawing Sheets

ELECTRICAL DISCHARGE MACHINING ELECTRODE HOLDER

CROSS-REFERENCE TO RELATED APPLICATIONS

This application is based on U.S. Provisional application 60/467,048 filed May 1, 2003 hereby incorporated by reference.

STATEMENT REGARDING FEDERALLY SPONSORED RESEARCH OR DEVELOPMENT

BACKGROUND OF THE INVENTION

The present invention relates generally to electrical discharge machines (EDM) and in particular to an electrode holder for such machines.

Electrical Discharge Machines (EDM) make use of specially shaped electrodes to cut complex surfaces into metal molds or the like. The surface cut in the workpiece mirrors the shape of the electrode which is typically machined on a numerically controlled milling machine or the like and then transferred to the EDM machine.

In order to obtain precise registration between the surface of the electrode cut on the milling machine and the work piece held in the EDM machine, it is known to attach special chucks to each of the these machines in predefined locations with respect to the milling cutter on the milling machine and the workpiece on the EDM machine. Once the chucks are located, the electrode may be transferred freely between the milling machine and the EDM machine while maintaining a precise registration.

Chucks and electrode holders for this purpose are available from the 3R Company, Midwest Technical Center, Elk Grove Village, Ill. These chucks and electrode holders are particularly designed to allow rapid automatic changing of electrodes on the milling and EDM machine (tool changing).

The electrode holders that are provide with such systems, which may provide a channel having inwardly directed set screws to grip the surface of the electrode are not well suited for some types of electrodes, in particular, for relatively thin or cylindrical graphite electrodes. Special fixtures may have to be prepared to hold these electrodes and/or the electrodes may need to be glued in place using epoxy or the like. This latter gluing step can make reuse of the relatively expensive electrode holders difficult.

SUMMARY OF THE INVENTION

The present invention provides an improved electrode holder for automatic tool changing systems in which the electrode is held in a slot compressed by a screw spanning the slot gap. This mechanism provides a simple yet robust method of releasably holding both thin, flat and cylindrical graphite electrodes in systems of this type.

Specifically, the present invention provides an electrode holder that may be used with an automatic tool changing system having at least two chucks that may alternately receive a tool. The chucks hold the tool between times of automatic removal and insertion at a predetermined fixed position with respect to the chuck and the tool has locating surfaces at a first face of the tool engaging locating surfaces at a second face of the chucks. The electrode holder includes a base having a locating surface engaging the locating surfaces of the chucks. A holder shaft extends from the base and has an electrode-receiving slot sized to receive a portion of a standard graphite electrode. A clamp screw draws the sides of the slot together about the electrode to hold the electrode therein.

Thus, it is one object of the invention to provide an improved method of holding electrodes for automatic tool changers that does not require epoxy or risk breaking of the electrode through point forces of set screws and the like, but rather it holds the electrode in a broad contact area of faces of a slot.

It is another object of the invention to provide a simple mechanism for holding electrodes of this type.

The slot may have a bottom conforming to one surface of the standard graphite electrode so that the standard graphite electrode may abut the bottom of the slot for support.

Thus, it is another object of the invention to provide additional support in the direction of principal force acting on the electrode.

The clamp screw may be positioned to pass through a hole in the graphite electrode when the standard graphite electrode is received within the slot.

It is thus another object of the invention to provide a balanced force to the electrode in the slot at a point centrally located in the electrode.

The holder shaft may include a coolant flow channel exiting from a bottom of the slot receiving the standard graphite electrode.

Thus, it is another object of the invention to provide an electrode holder particularly suitable for use in EDM machines where coolant must be constantly flushed over the surface of the electrode.

The slot may provide opposed planer sides or opposed hemi cylindrical sides.

Thus, it is another object of the invention to provide an electrode holder suitable for both rectangular and cylindrical electrodes.

The sides of the slot may be separated substantially by the thickness of the standard graphite electrode.

Thus, it is another object of the invention to provide for relatively little flexure of the slot so as to provide even compression of the electrode.

The base may include a base plate having threaded holes receiving machine screws securing the base plate to a chuck plate having the locating surfaces engaging locating surfaces of the chucks.

Thus it is another object of the invention to provide an electrode holder that may be used with standard chucks for automatic tool changers manufactured by third parties by attaching the plate of the electrode holder to an adapter plate manufactured by the third parties.

These particular objects and advantages may apply to only some embodiments falling within the claims and thus do not define the scope of the invention.

DETAILED DESCRIPTION OF THE PREFERRED EMBODIMENT

The present invention provides a graphite electrode holder 10 for use with electrical discharge machining (EDM) machines in which electrical discharge is used to shape complex machine surfaces suitable for injection molds and the like.

Figure 1:
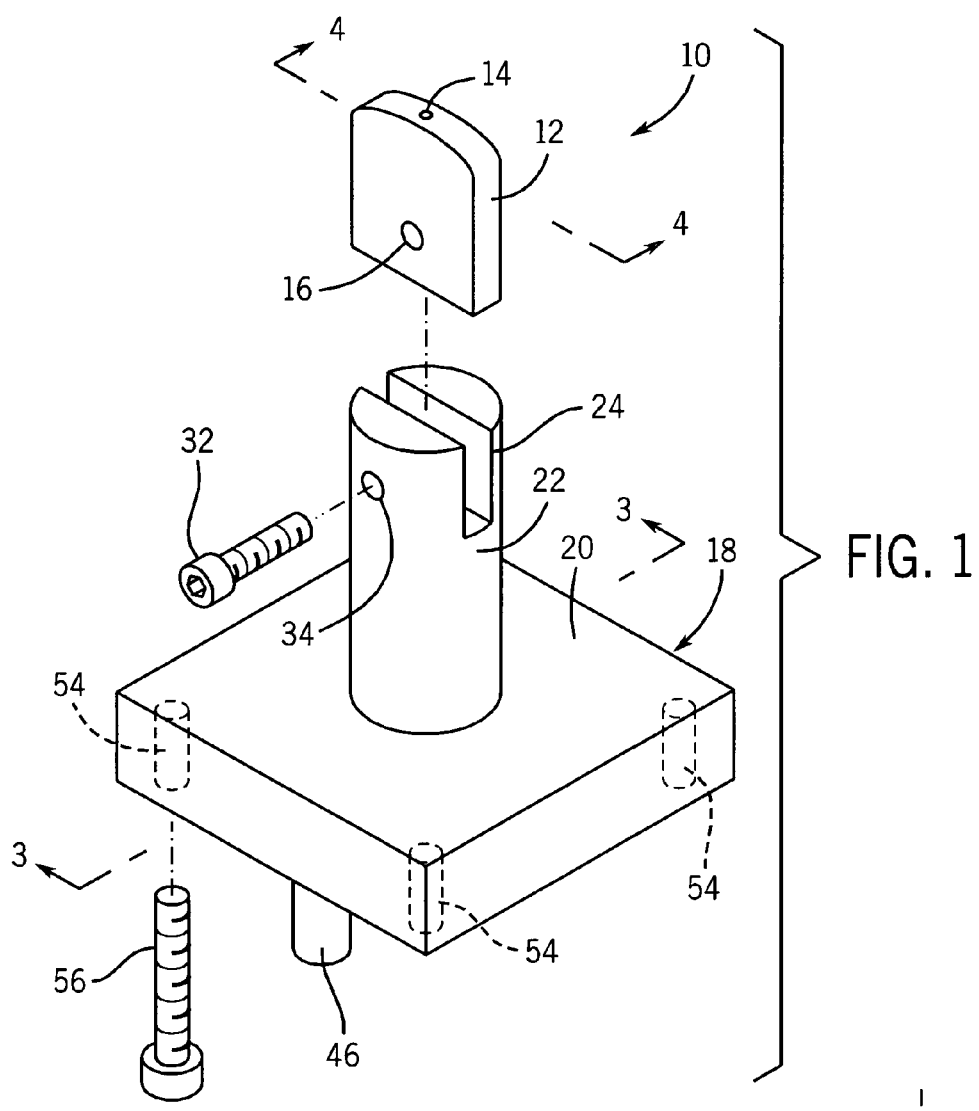
FIG. 1 is an exploded perspective view of the electrode holder of the present invention with a chuck for use with rectangular electrodes.

Referring to FIG. 1, a standard rectangular graphite electrode 12 is generally a rectangular parallelepiped having, for example, a width of 0.375 inches measured along a transverse direction between its broad faces and a height and width of arbitrary length. An upper surface of the rectangular graphite electrode is typically machined to provide a suitable tool surface for EDM machining. Rectangular graphite electrodes 12 of this general type are commercially available through a variety of sources.

When used with the present invention, an axial hole 14 is bored through the rectangular graphite electrode 12 to extend along its vertical height. The axial hole 14 is of relatively small diameter; for example, 1/16th of an inch to allow for coolant flow through the tool as will be described. A transverse hole 16 intersects the axial hole 14 near the lower edge of the rectangular graphite electrode 12. The transverse hole 16, for example, may be approximately 0.25 inches in diameter and is intended to provide clearance for coolant flow as will also be described.

The rectangular graphite electrode 12 may be held in a fixture 18 following a design of the present invention and having a generally square base 20 with an upwardly extending cylindrical post 22 at its center. The post 22 and base 20 may be fabricated of 4140 steel. The upper end of the post 22 is cut with a longitudinal slot 24 having a width corresponding to that of the graphite electrode 12 (e.g., approximately 0.375 inches plus 0.001 and minus 0.000). The longitudinal slot 24 is sized so that the rectangular graphite electrode 12 may fit within the longitudinal slot 24 with the bottom surface of the graphite electrode 12 resting against the bottom surface of the slot 24.

Figure 3:
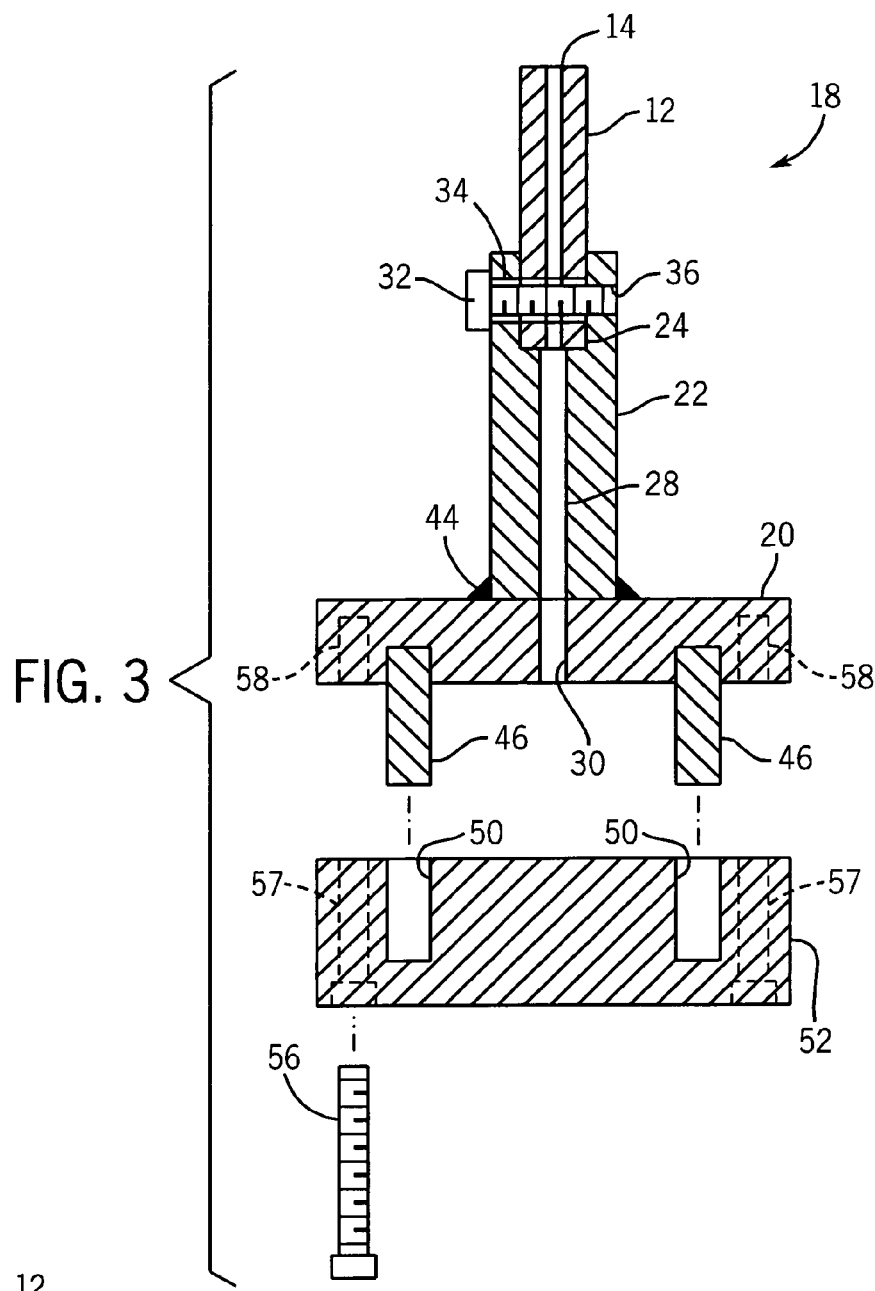
FIG. 3 is a cross section taken along lines 3—3 of FIG. 1.

Referring to FIG. 3, as so positioned, the axial hole 14 of the rectangular graphite electrode 12 is aligned with an axial hole 28 (shown in FIG. 3) extending vertically through the center of the post 22. In turn, the axial hole 28 of the post 22 aligns with an axial hole 30 extending through base 20. The holes 14, 28, and 30 thereby providing a continuous path for coolant flow from beneath the base to the work piece being machined by the rectangular graphite electrode 12.

Referring now to FIGS. 1 and 3, a clearance hole 34 is cut in one wall of the slot 24 to align with a threaded hole 36 on the opposite wall of the slot 24. Once the rectangular graphite electrode 12 is placed within the slot 24, a machine screw 32 may be inserted transversely through the clearance hole 34 to extend through the transverse hole 16 in the rectangular graphite electrode 12 to pass through the slot 24 to engage the internally tapped threaded hole 36. When the machine screw 32 is tightened, it pulls the sides of the slot 24 together about the rectangular graphite electrode 12 contacting a broad area of the graphite electrode 12 eliminating the need for epoxy or the like, while providing a secure grip on the electrode.

Figure 4:
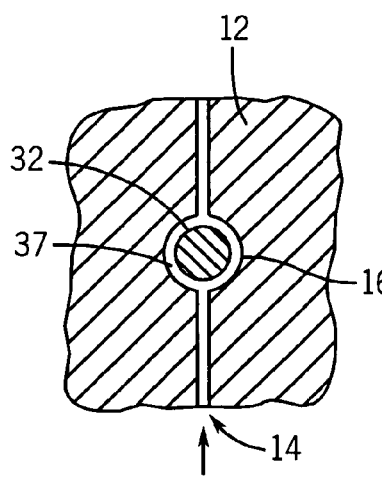
FIG. 4 is a fragmentary cross section of the electrode within the chuck of FIG. 1 (unexploded) taken along line 4—4 of FIG. 1.

Referring to FIG. 4, when the machine screw 32 passes through the transverse hole 16 in the graphite, the size of the transverse hole 16 is larger than the cross-section of the machine screw 32 providing for a circular channel 37 passing around the machine screw 32 allowing clear flow of solvent through axial hole 14.

Figure 2:
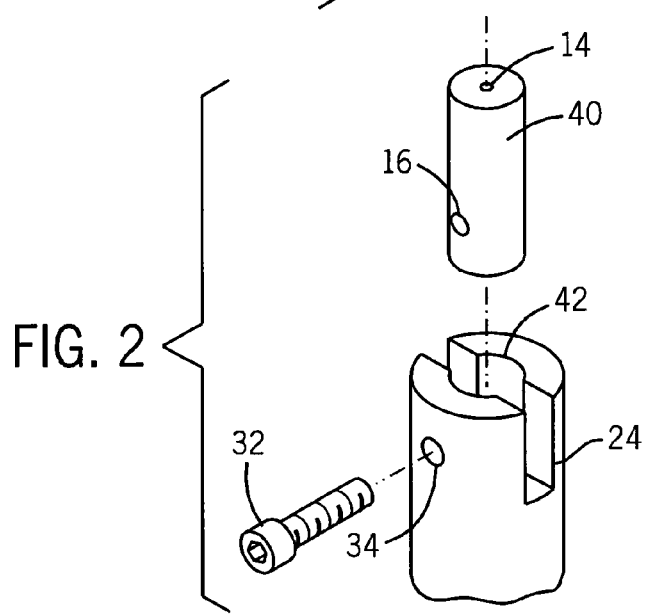
FIG. 2 is a fragmentary perspective view of an alternative embodiment with a chuck for cylindrical electrodes.

Referring now to FIG. 2, the present invention may be simply modified for use with cylindrical graphite electrode 40 also having an axial hole 14 and a transverse hole 16. The cylindrical graphite electrode 40 is in this case received within bore 42 cut in the slot 24 at the upper end of the post 22 equal in diameter to the diameter of the cylindrical graphite electrode 40 (e.g. with tolerances of minus 000 and plus 0.001). Again a clearance hole 34 is provided in one side of the slot 24 aligned with a threaded hole 36 (not shown). A machine screw 32 serves to compress the sides of the bore 42 against the graphite electrode 40 to provide a large area contact preventing looseness or movement of the graphite electrode 40.

Referring now to FIG. 3, weld fillets 44 may hold the post 22 to the upper surface of the base 20 as has been described. Expandable dowel pins 46 may extend downward from a lower surface of the base 20 to be received by corresponding bores 50 in a chuck plate 52 such as a macro fixture available from the 3R Company, Midwest Technical Center, Elk Grove Village, Ill. For this purpose, each corner of the base 20 may have a hole 54 tapped with M-6 metric threads which may receive machine screws 56 that pass upward through counterbored holes 57 in the chuck plate 52 and are received by threaded holes 54 in the base 20 to hold the base 20 and chuck plate 52 together as aligned by the dowel pins 46.

The fixture 18 provides a positive location of a particular graphite electrode 12 with respect to the dowel pins 46 in the bottom surface of the base 20 that may be used to ensure accurate location of the electrode 12 when it and the chuck plate 52 are transferred between chucks (not shown), one located on an electrode shaper (e.g., a milling cutter used to form the upper surface of the electrode 12) and, one located on the EDM machine.

It is specifically intended that the present invention not be limited to the embodiments and illustrations contained herein, but include modified forms of those embodiments including portions of the embodiments and combinations of elements of different embodiments as come within the scope of the following claims.

I claim:

1. An electrode holder for use with an automatic tool changing system having at least two chucks that may alternately receive a tool, the chucks holding the tool for automatic removal and insertion at a predetermined fixed position with respect to the chuck, the tool having locating surfaces engaging locating surfaces on the chucks, the electrode holder comprising:
    a base having a locating surface sized to engage the locating surfaces of the chucks;
    a holder shaft extending from the base having an electrode receiving slot sized to received a portion of a graphite electrode; and
    a clamp screw drawing sides of the slot together about the electrode to hold the electrode therein.

2. The electrode holder of claim 1 wherein the slot has a bottom conforming to one surface of the graphite electrode so that the graphite electrode may abut the bottom of the slot for support.

3. The electrode holder of claim 1 wherein the clamp screw is positioned to pass through a hole in the graphite electrode when the graphite electrode is received within the slot.

4. The electrode holder of claim 1 wherein the holder shaft includes a coolant flow channel exiting from a bottom of the slot receiving the graphite electrode.

5. The electrode holder of claim 1 wherein the slot provides opposed planar sides.

6. The electrode holder of claim 1 wherein the slot provides opposed hemicylindrical sides.

7. The electrode holder of claim 1 wherein the sides of the slot are separated substantially by a thickness of the graphite electrode.

8. The electrode holder of claim 1 wherein the base includes a base plate having threaded holes receiving machine screws securing the base plate to a chuck plate having the locating surfaces engaging locating surfaces of the chucks.

9. The electrode holder of claim 8 wherein the base plate includes locating pins extending from the locating surface of the base plate to engage the locating bores of the chuck plate when the locating surface of the base plate engages the locating surface of the chuck plates.

10. An electrode assembly for use with an automatic tool changing system having at least two chucks that may alternately receive a tool, the chucks holding the tool for automatic removal and insertion at a predetermined fixed position with respect to the chuck, the tool having locating surfaces at a first face of the tool plate, the electrode assembly comprising:
   a base having a locating surface sized to engage the locating surfaces of the chucks;
   a holder shaft extending from the base having an electrode receiving slot sized to received a portion of a graphite electrode, the holder shaft including a coolant flow channel exiting from a bottom of the slot receiving the graphite electrode; and
   a graphite electrode having a central coolant channel aligning with the coolant flow channel of the holder shaft and having a perpendicular mounting bore intersecting the coolant flow channel;
   a clamp screw passing through sides of the slot and the mounting bore of the graphite electrode drawing sides of the slot together about the electrode to hold the electrode therein, the mounting screw sized to be smaller than the mounting bore to allow passage of coolant flow around the mounting screw.

11. The electrode assembly of claim 10 wherein the base includes threaded holes receiving machine screws securing the base to the chuck plate.

12. The electrode assembly of claim 10 wherein the slot provides opposed planar sides.

13. The electrode assembly of claim 10 wherein the slot provides opposed hemicylindrical sides.

14. The electrode holder of claim 10 wherein the base includes a base plate having threaded holes receiving machine screws securing the base plate to a chuck plate having the locating surfaces engaging locating surfaces of the chucks.

15. The electrode holder of claim 14 wherein the base plate includes locating pins extending from the locating surface of the base plate to engage the locating bores of the chuck plate when the locating surface of the base plate engages the locating surface of the chuck plates.

* * * * *